United States Patent
Sandgren et al.

(10) Patent No.: US 10,269,032 B1
(45) Date of Patent: Apr. 23, 2019

(54) ELECTRONIC SYSTEM FOR SENDING CONSOLATION PROMOTIONAL OFFER BASED UPON UNAVAILABLE SELECTED PROMOTIONAL OFFER AND RELATED METHODS

(71) Applicant: CAROLINA COUPON CLEARING, INC., Winston-Salem, NC (US)

(72) Inventors: Jeffrey Sandgren, Kernersville, NC (US); Richard Polhemus, Winston-Salem, NC (US)

(73) Assignee: CAROLINA COUPON CLEARING, INC., Winston-Salem, NC (US)

( * ) Notice: Subject to any disclaimer, the term of this patent is extended or adjusted under 35 U.S.C. 154(b) by 347 days.

(21) Appl. No.: 14/887,711

(22) Filed: Oct. 20, 2015

(51) Int. Cl.
*G06Q 30/00* (2012.01)
*G06Q 30/02* (2012.01)

(52) U.S. Cl.
CPC ..... *G06Q 30/0224* (2013.01); *G06Q 30/0207* (2013.01)

(58) Field of Classification Search
None
See application file for complete search history.

(56) References Cited

U.S. PATENT DOCUMENTS

| 7,006,983 B1 | 2/2006 | Packes, Jr. et al. | |
| 2002/0161631 A1* | 10/2002 | Banerjee | G06Q 30/02 705/14.35 |
| 2013/0006738 A1* | 1/2013 | Horvitz | G06O 30/0207 705/14.16 |
| 2016/0203506 A1* | 7/2016 | Butler, IV | G06Q 30/0222 705/14.23 |

* cited by examiner

*Primary Examiner* — Alvin L Brown
(74) *Attorney, Agent, or Firm* — Allen, Dyer, Doppelt, + Gilchrist, P.A. Attorneys at Law (57) ABSTRACT

An electronic system may include communications devices and an electronic promotional offer server that includes a promotional offer memory to store promotional offers and a promotional offer processor to send a listing of promotional offers to the communications devices based upon the promotional offers. Each communications device may include a portable housing and a controller coupled to communications circuitry, an input device, and a display. The controller may be configured to display the listing of promotional offers on the display, cooperate with the input device to permit user selection of promotional offers from the listing thereof, and transmit the selected promotional offers to the electronic promotional offer server. The promotional offer processor may determine if the selected promotional offer is currently unavailable, and, when so, send a consolation promotional offer to the communications device.

18 Claims, 7 Drawing Sheets

ELECTRONIC SYSTEM FOR SENDING CONSOLATION PROMOTIONAL OFFER BASED UPON UNAVAILABLE SELECTED PROMOTIONAL OFFER AND RELATED METHODS

TECHNICAL FIELD

The present invention is related to the field of electronics, and more particularly, to a system for processing electronic promotional offers, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

As the capability of electronic devices increases, it may be particularly desirable to use such devices as part of a marketing campaign, for example, to provide electronic coupons or electronic promotional offers. Similar to a paper coupon, an electronic promotional offer encourages a consumer to visit a particular retailer and/or purchase a particular product in exchange for a discount, free product, and/or other benefit conferred upon the consumer. With an electronic promotional offer, unlike a paper coupon, consumer data, for example, shopping habits and/or brand preferences may more easily be acquired.

Promotional offer providers generally have a dollar amount to spend on a given promotional offer campaign, for example, in terms of redemption. Statistics may give an idea on how many promotional offers of a given promotional offer campaign are likely to be redeemed. However, there may be instances where the promotional offer campaign is withdrawn or cancelled because the dollar amount equivalent to the amount of promotional offers redeemed has been met.

U.S. Pat. No. 7,006,983 to Packes et al. is directed to a system for processing a rebate. More particularly, Packes et al. discloses providing a point of sale (POS) rebate. If the POS rebate has expired, a consolation POS rebate may be made in an effort to maintain the good will of the consumer, or the consumer may be allowed to redeem the offer but may be penalized in future transactions.

SUMMARY

An electronic system may include a plurality of communications devices and an electronic promotional offer server. The electronic promotional offer server may include a promotional offer memory configured to store a plurality of promotional offers, and a promotional offer processor coupled to the promotional offer memory and configured to send a listing of promotional offers to the plurality of communications devices based upon the plurality of promotional offers. Each of the plurality of communications devices may include communications circuitry, at least one input device, a display, and a controller configured to display the listing of promotional offers on the display, cooperate with the at least one input device to permit user selection of at least one of the promotional offers from the listing thereof, and transmit the selected at least one promotional offer to the electronic promotional offer server via the communications circuitry. The promotional offer processor may be configured to determine if the selected at least one promotional offer is currently unavailable, and, when so, send at least one consolation promotional offer to the communications device. Accordingly, consolation offers may be provided for unavailable selected electronic promotional offers.

The plurality of communications devices may include a plurality of wireless communications devices and wherein the communications circuitry may include wireless communications circuitry, for example. The promotional offer processor may be configured to determine if the selected at least one promotional offer is currently unavailable based upon a number of promotional offers of the plurality thereof corresponding to the selected at least one promotional offer being sent, for example. The promotional offer processor may be configured to determine if the selected at least one promotional offer is currently unavailable based upon being absent from the promotional offer memory.

The at least one consolation promotional offer may be for a same retailer as the currently unavailable at least one promotional offer. The at least one consolation promotional offer may be for a same brand as the currently unavailable at least one promotional offer, for example. The at least one consolation promotional offer may be for a same product and a different product brand as the currently unavailable at least one promotional offer.

The promotional offer processor may be configured to send at least one promotional offer stored in the promotional offer memory and corresponding to the selected at least one promotional offer when the selected at least one promotional offer is currently available, for example. The promotional offer processor may be configured to send the listing of promotional offers to the plurality of communications devices based upon a user purchase history. The promotional offer processor may be configured to send the listing of promotional offers to the plurality of communications devices via an email, for example.

A method aspect is directed to a method of using an electronic promotional offer server that includes a promotional offer memory configured to store a plurality of promotional offers, and a promotional offer processor coupled to the promotional offer memory to send a listing of promotional offers to a plurality of communications devices based upon the plurality of promotional offers. The method may include using each of the plurality of communications devices to display the listing of promotional offers on a display, cooperate with a at least one input device to permit user selection of at least one of the promotional offers from the listing thereof, and transmit the selected at least one promotional offer to the electronic promotional offer server via communications circuitry. The method may also include using the electronic promotional offer server to determine if the selected at least one promotional offer is currently unavailable, and, when so, send at least one consolation promotional offer to the communications device.

BRIEF DESCRIPTION OF THE DRAWINGS

FIG. 3b illustrates selected electronic promotional offers from the available promotional offers of FIG. 3a.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
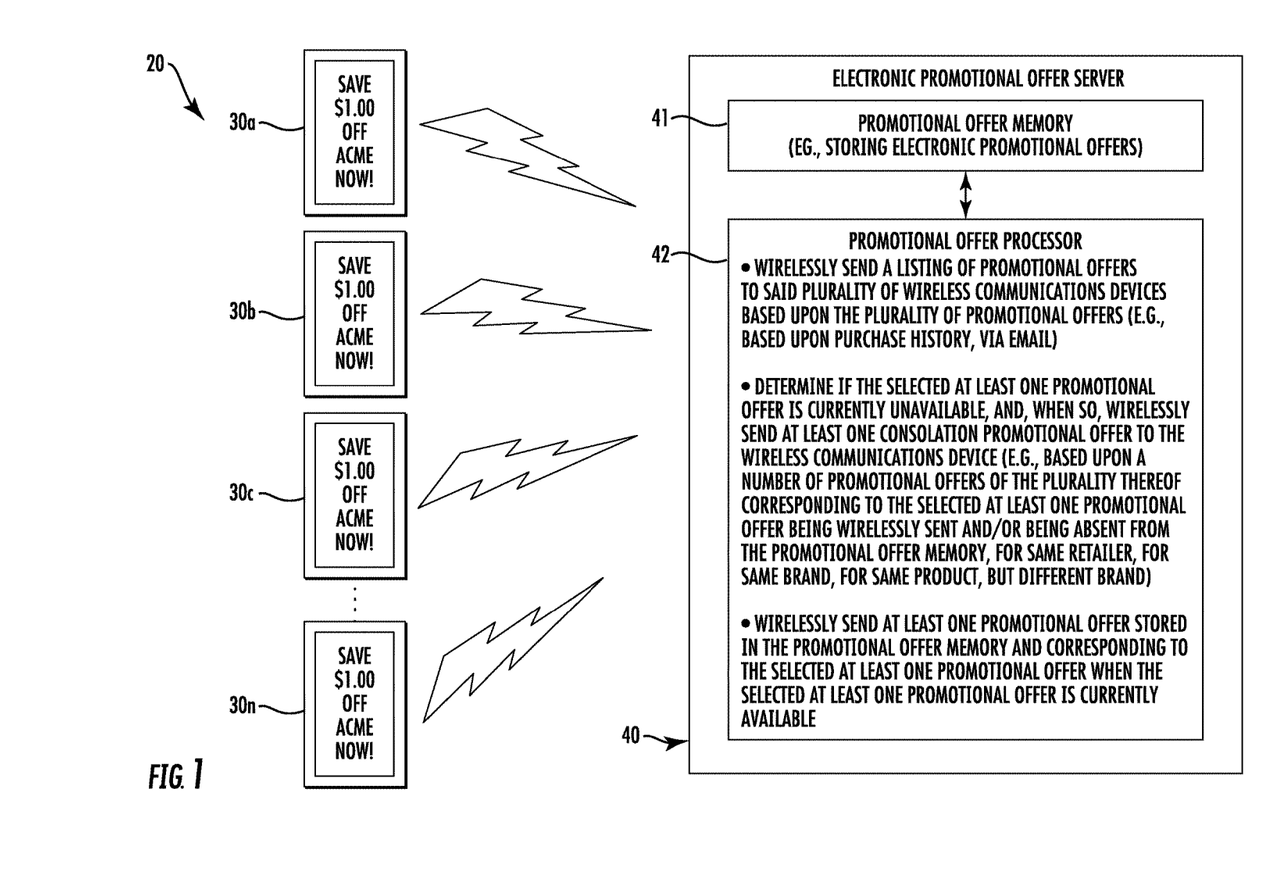
FIG. 1 is a schematic block diagram of an electronic system according to an embodiment of the present invention.
Figure 2:
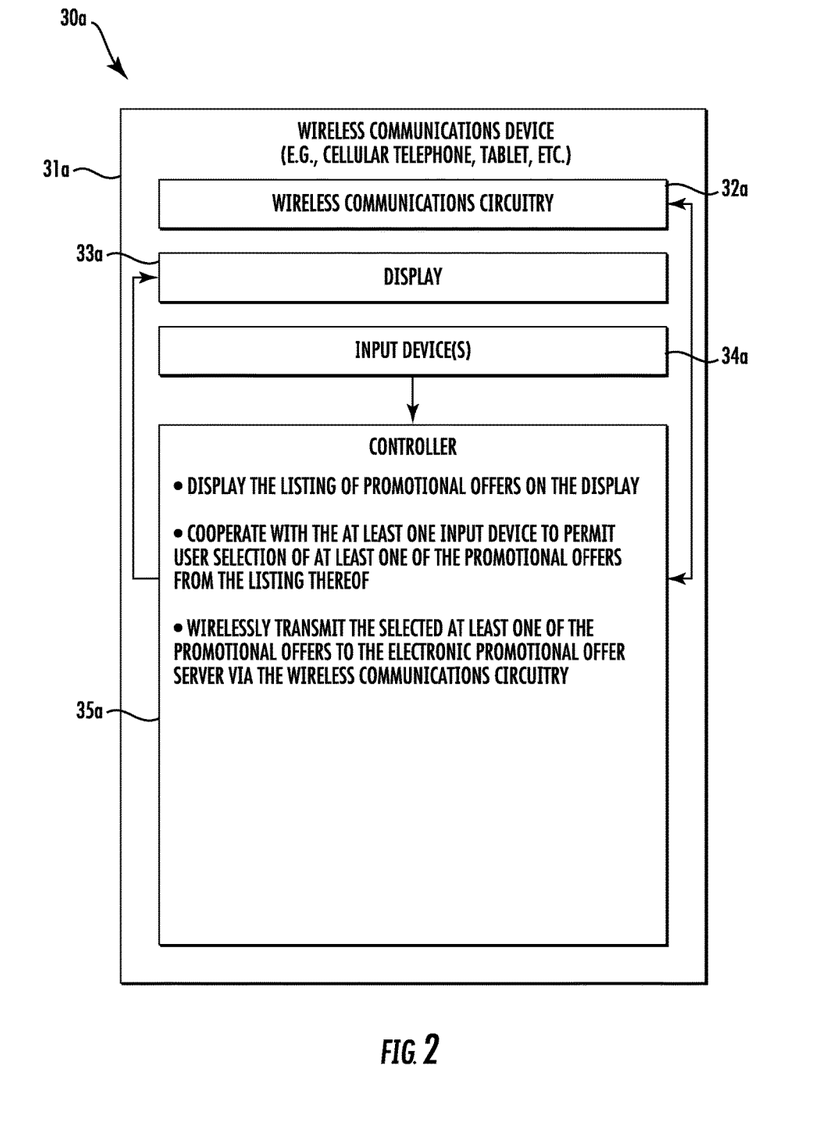
FIG. 2 is a schematic block diagram of an exemplary communications device of the system of FIG. 1.
Figure 3A:
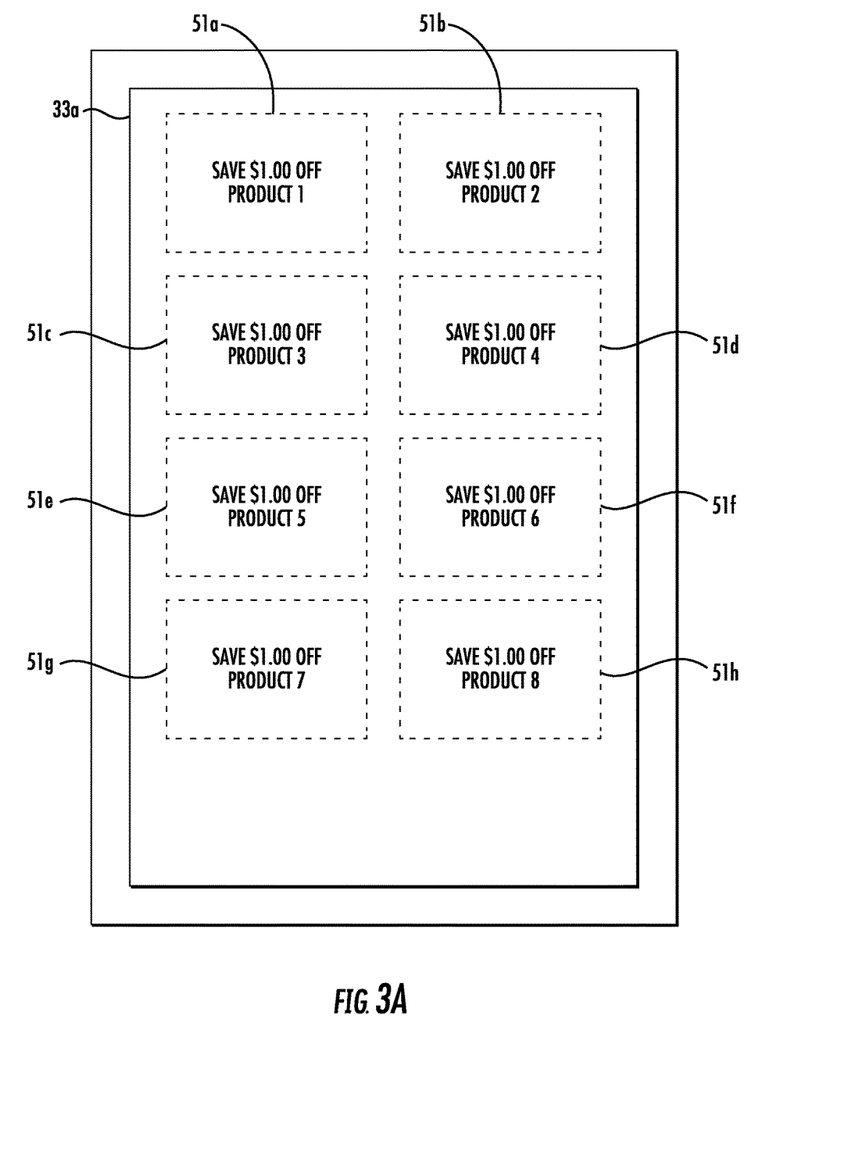
FIG. 3a illustrates available electronic promotional offers on the display of the exemplary communications device of FIG. 2.
Figure 3B:
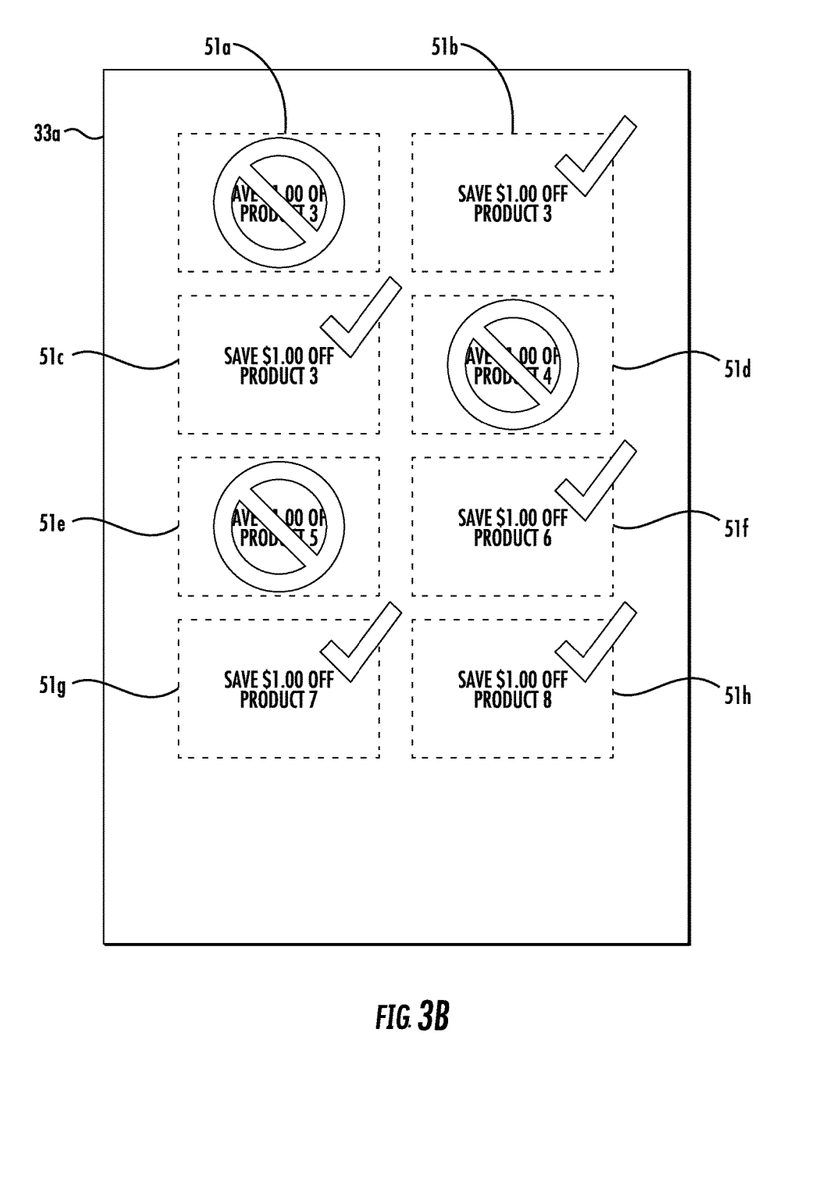
Figure 3C:
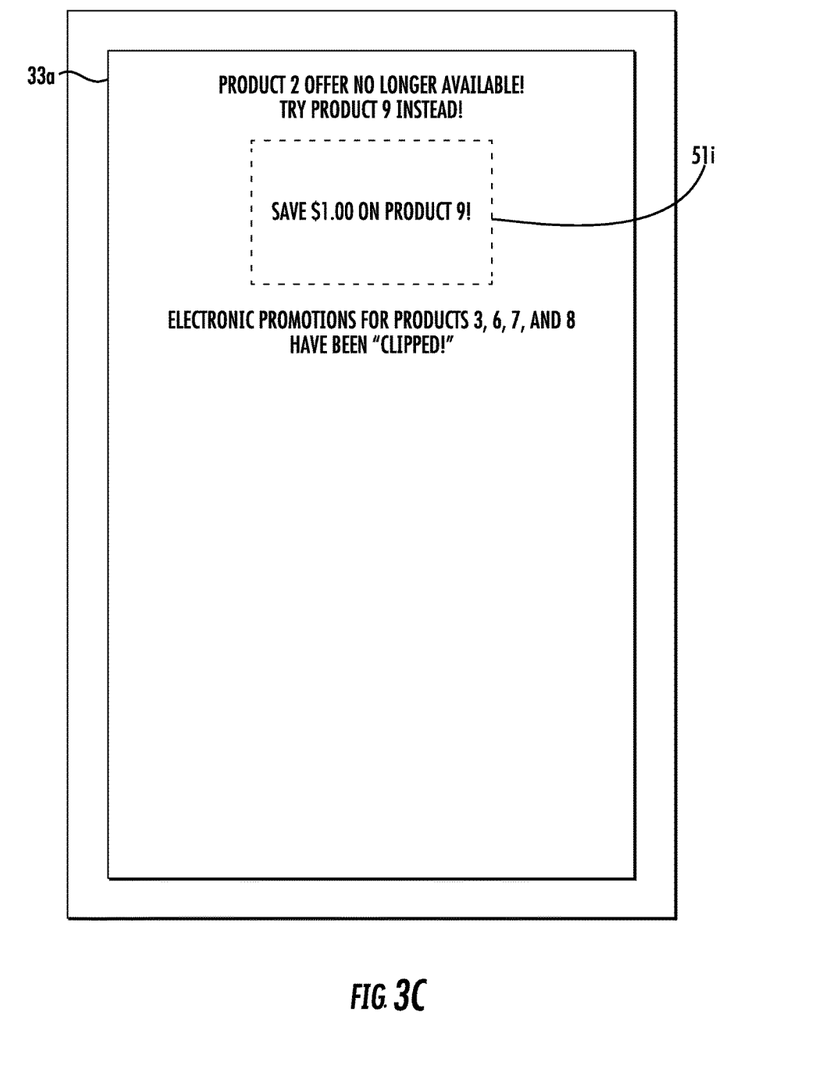
FIG. 3c illustrates a consolation electronic promotional offer for the unavailable one of the selected electronic promotional offers of FIG. 3b.
Figure 4A:
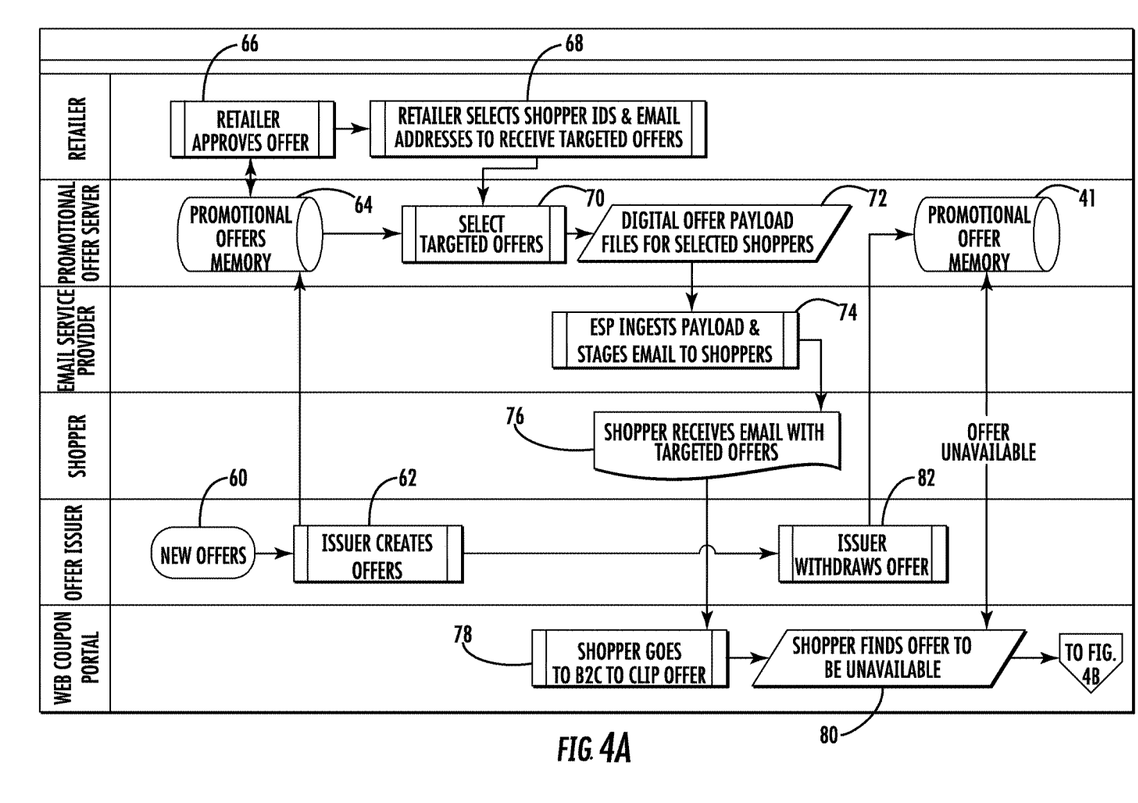
FIG. 4a is a flow diagram illustrating part of operation of the electronic system in accordance with an embodiment of the present invention.
Figure 4B:
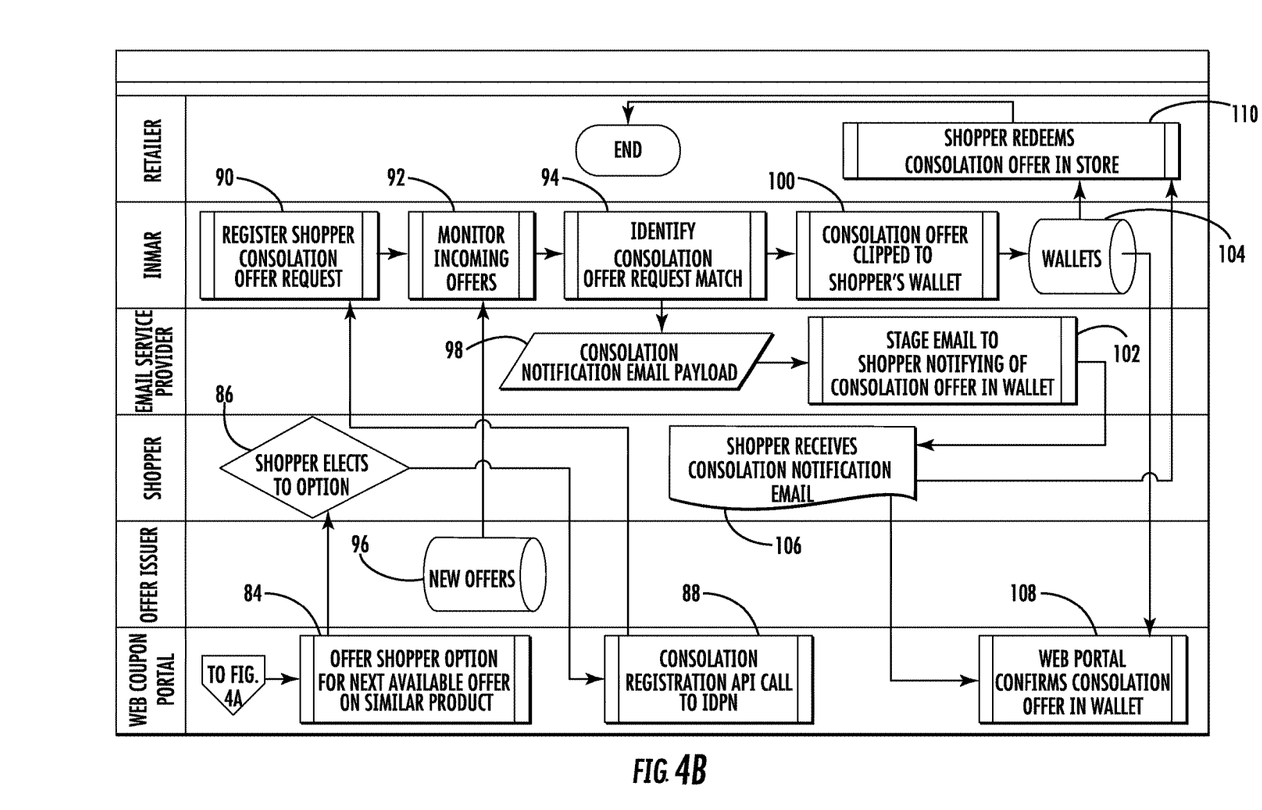
FIG. 4b is a flow diagram illustrating part of operation of the electronic system in accordance with an embodiment of the present invention.

Referring to FIGS. 1, 2, 3a-3c, and the flow diagram in FIGS. 4a and 4b, an electronic system 20 illustratively includes an electronic promotional offer server 40 that includes a promotional offer memory 41 that stores promotional offers and a promotional offer processor 42 coupled to the promotional offer memory. The promotional offer processor 42 wirelessly sends a listing of promotional offers to wireless communications devices 30a-30n based the promotional offers. The promotional offers may be provided to the electronic promotional offer server 40 by an offer issuer (Blocks 60, 62), for example, a manufacturer, retailer, and/or other offer providing entity. In some embodiments, a retailer may opt to approve or accept the promotional offers (Block 64) for storage in the promotional offer memory 41 (Block 66) for distribution by the electronic promotional offer server 40 and/or select specific shoppers (Block 68), by way of associated wireless communications devices 30a-30n, to which to wirelessly send the listing of promotional offers (FIG. 3a). Additionally, specific users may be targeted for specific promotional offers 51a-51h (Block 70), for example, based upon prior purchases or a purchase history. Other and/or additional criteria may be used for sending specific or targeted promotional offers.

The electronic promotional offer server 40 may send the promotional offers as an email to each wireless communications device 30a-30n, for example (Block 76). In some embodiments, an email service provider may be used as an intermediary to stage and store emails for distribution to the wireless communications devices 30a-30n. In particular, digital offer payload files (Block 72) for selected shoppers are sent from the electronic promotional offer server 40 to the email service provider, who receives the payload and stages the email to the wireless communications devices 30a-30n (i.e., shoppers associated with the wireless communications devices).

The wireless communications devices 30a-30n are in the form of mobile telephones. Each of the wireless communications devices 30a-30n includes a portable housing 31a and wireless communications circuitry 32a carried by the portable housing. The wireless communications circuitry 32a may include a wireless receiver, transmitter, and/or other circuitry for wireless communications. The wireless communications circuitry 32a may be cellular, WiFi, and/or other communications circuitry, for example. Each wireless communications device 30a-30n also includes an input device 34a carried by the portable housing 31a. The input device 34a may be in the form of a pushbutton switch, a touch screen, and/or other type of input device as will be appreciated by those skilled in the art. In some embodiments, the mobile wireless communications devices may not be in the form of a mobile phone, and may be a tablet computer, laptop computer, etc.

Each wireless communications device 30a-30n also includes a display 33a carried by the portable housing 31a. A controller 35a in each wireless communications device 30a-30n is carried by the portable housing 31a and coupled to the wireless communications circuitry 32a, the input device 34a, and the display 33a. The controller 35a displays the listing of promotional offers on the display 33a, for example, when the user receives and opens the email that includes the promotional offers (Block 76) or a link to a webpage or web portal hosted by the electronic promotional offer server 40. The controller 35a cooperates with the input device 34a to permit user selection of promotional offers from the listing thereof, for example, from the web portal (Block 78) (FIG. 3b). This selection may be referred to as "clipping." The controller 35a wirelessly transmits the selected promotional offers 51a, 51c, 51f, 51g, 51h to the electronic promotional offer server 40, for example, for storing the promotional offer in a digital wallet associated with the device and/or user. It should be noted that while mobile wireless communications devices 30a-30n are described herein and promotional offers being wirelessly sent, the wireless communications devices may not be wireless and the promotions may be sent via wired communications circuitry, for example, or a combination of wired and wireless communications circuitry.

The promotional offer processor 42 of the electronic promotional offer server 40 determines if the selected promotional offers are currently unavailable. If the selected promotional offers are currently available, the promotional offer processor 42 wirelessly sends the promotional offers stored in the promotional offer memory 41 that correspond to the selected promotional offers, for example, for display on the wireless communications devices 30a-30n or display of confirmation that the promotional offers have been stored and/or are available.

If the promotional offer processor 42 determines the selected promotional offers are currently unavailable (Block 80), for example, by comparing based upon a number of promotional offers of the plurality thereof corresponding to the selected promotional offers being wirelessly sent. In other words, for example, if a threshold number of offers were approved by the offer issuer, and those have already been wirelessly sent to mobile wireless communications devices 30a-30n. Alternatively or additionally, the promotional offer processor may determine if the selected promotional offers are currently unavailable based upon being discontinued. A given promotional offer may be discontinued and marked as such in the promotional offer memory 41, for example, when the offer issuer pulls or cancels a promotional offer (Block 82), which may occur when a budget has been exceeded.

For the selected ones of the promotional offers for which the promotional offers are unavailable, the promotional offer processor 42 may cooperate to wirelessly send a corresponding consolation promotional offer to the wireless communications device 30a-30n (Block 84) (FIG. 3c). More than one consolation promotional offer may be sent for a given unavailable selected promotional offer, as will be appreciated by those skilled in the art. The electronic promotional offer processor 42 may send the consolation offers in the same manner as the initial promotional offers, for example, in the form of an email and by way of email service provider. Similar to the initial promotional offers, the consolation promotional offers may be "clipped" and added to a digital wallet and confirmed by a web portal.

More particularly, a user may choose to select the consolation offer (Block 86) via the input device 34a, and the user's selection may be sent to the electronic promotional offer server 40 (Block 88) for processing (Block 90). New promotional offers (Block 96) from offer issuers may be monitored by the electronic promotional offer server 40 (Block 92). The electronic promotional offer server 40 identifies a match of a consolation offer requests (Block 94) and sends the notification to the mobile wireless communications devices 30a-30n, for example, via an email (Block 106). The electronic promotional offer server 40 may send a consolation offer notification in the payload of an email to the email service provider (Block 98) which stages the email that notifies the user that the consolation offer has been clipped or placed in the user's digital wallet (Block 102). The user or mobile wireless communications device 30a-30n receives the consolation notification email (i.e., that the consolation offer has been clipped (Block 106) and confirmed in the web portal (Block 108)).

Each consolation promotional offer may be for a same retailer as the currently unavailable at least one promotional offer. Each consolation promotional offer may be for a same brand as the currently unavailable promotional offer. Each consolation promotional offer may also be for a same product and a different product brand as the currently unavailable at least one promotional offer. Of course, each consolation offer may be based upon other and/or additional factors.

By providing consolation offers, the electronic system 20 addresses the technical problem of timing and synchronization with electronic or digital promotional offers. Indeed, it is possible, and in some cases likely, that an electronic promotional offer can be withdrawn, cancelled, or otherwise expired before redemption, even if it was clipped by a user, for example, due to the electronic and wireless nature of the promotional offers. In other words, in the time period after clipping, but before redemption, a promotional offer may become unavailable. In such instances, a user or shopper may become increasingly frustrated, which may in turn result in the shopper not clipping future electronic promotional offers. Since the promotional offers cannot be rescinded or withdrawn once they are sent, for example, by email, by providing consolation promotional offers, the shopper may recognize increased value and continue clipping electronic promotional offers and may generally be happier.

Moreover, the electronic system 20 acquires information in a way that generally cannot be acquired through conventional techniques or methods. In particular, the electronic system captures consumer alternate preferences (i.e., if you cannot have A, would you accept B, or would you rather have C?). This data may be relatively valuable as it may be used for analytics, targeting, and shopper engagement.

A method aspect is directed to a method of using an electronic promotional offer server 40 that includes a promotional offer memory 41 configured to store a plurality of promotional offers, and a promotional offer processor 42 coupled to the promotional offer memory to wirelessly send a listing of promotional offers to a plurality of wireless communications devices 30a-30n based upon the plurality of promotional offers. The method includes using each of the plurality of wireless communications devices 30a-30n to display the listing of promotional offers on a display 33a, cooperate with a at least one input device 34a to permit user selection of at least one of the promotional offers from the listing thereof, and wirelessly transmit the selected at least one promotional offer to the electronic promotional offer server via wireless communications circuitry 32a. The method also includes using the electronic promotional offer server 40 to determine if the selected at least one promotional offer is currently unavailable, and, when so, wirelessly send at least one consolation promotional offer to the wireless communications device 30a-30n.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic system comprising:
a plurality of communications devices each associated with a respective user; and
an electronic promotional offer server comprising
a promotional offer memory configured to store a plurality of electronic promotional offers each associated with a respective offer issuer, and
a promotional offer processor coupled to said promotional offer memory and configured to send a listing of electronic promotional offers to said plurality of communications devices based upon the plurality of promotional offers;
each of said plurality of communications devices comprising
communications circuitry,
at least one input device,
a display, and
a controller configured to
display the listing of electronic promotional offers on said display,
cooperate with the at least one input device to permit user selection of at least one of the electronic promotional offers from the listing thereof for clipping to a digital wallet associated with the respective user, and
transmit the selected at least one electronic promotional offer to said electronic promotional offer server via said communications circuitry;
said promotional offer processor configured to determine if the selected at least one electronic promotional offer is currently unavailable based upon, after clipping, one of a number of already sent electronic promotional offers and the electronic promotional offer being cancelled before an expiration date of the electronic promotional offer by the respective offer issuer, and, when so, send at least one consolation electronic promotional offer to the communications device.

2. The electronic system of claim 1 wherein said plurality of communications devices comprises a plurality of wireless communications devices; and wherein said communications circuitry comprises wireless communications circuitry.

3. The electronic system of claim 1 wherein the at least one consolation electronic promotional offer is for a same retailer as the currently unavailable at least one electronic promotional offer.

4. The electronic system of claim 1 wherein the at least one consolation electronic promotional offer is for a same brand as the currently unavailable at least one electronic promotional offer.

5. The electronic system of claim 1 wherein the at least one consolation electronic promotional offer is for a same product and a different product brand as the currently unavailable at least one electronic promotional offer.

6. The electronic system of claim 1 wherein said promotional offer processor is configured to send at least one electronic promotional offer stored in the promotional offer memory and corresponding to the selected at least one electronic promotional offer when the selected at least one electronic promotional offer is currently available.

7. The electronic system of claim 1 wherein said promotional offer processor is configured to send the listing of electronic promotional offers to said plurality of communications devices based upon a user purchase history.

8. The electronic system of claim 1 wherein said promotional offer processor is configured to send the listing of electronic promotional offers to said plurality of communications devices via an email.

9. An electronic promotional offer server comprising:
a promotional offer memory configured to store a plurality of electronic promotional offers each associated with a respective offer issuer; and
a promotional offer processor coupled to said promotional offer memory and configured to
send a listing of electronic promotional offers to a plurality of communications devices each associated with a respective user based upon the plurality of electronic promotional offers, each of the plurality of communications devices configured to display the listing of electronic promotional offers on a display, cooperate with at least one input device to permit user selection of at least one of the electronic promotional offers from the listing thereof for clipping to a digital wallet associated with the respective user, and transmit the selected at least one electronic promotional offer to the electronic promotional offer server, and
determine if the selected at least one promotional offer is currently unavailable based upon, after clipping, one of a number of already sent electronic promotional offers and the electronic promotional offer being cancelled before an expiration date of the electronic promotional offer by the respective offer issuer, and, when so, send at least one consolation electronic promotional offer to the communications device.

10. The electronic promotional offer server of claim 9 wherein the at least one consolation electronic promotional offer is for at least one of a same retailer as the currently unavailable at least one electronic promotional offer, a same brand as the currently unavailable at least one electronic promotional offer, and a same product and a different product brand as the currently unavailable at least one electronic promotional offer.

11. The electronic promotional offer server of claim 9 wherein said promotional offer processor is configured to send at least one electronic promotional offer stored in the promotional offer memory and corresponding to the selected at least one electronic promotional offer when the selected at least one electronic promotional offer is currently available.

12. The electronic promotional offer server of claim 9 wherein said promotional offer processor is configured to send the listing of electronic promotional offers to said plurality of communications devices based upon a user purchase history.

13. The electronic promotional offer server of claim 9 wherein said promotional offer processor is configured to send the listing of electronic promotional offers to said plurality of communications devices via an email.

14. A method of sending a consolation offer comprising:
using an electronic promotional offer server comprising a promotional offer memory configured to store a plurality of electronic promotional offers each associated with a respective offer issuer, and a promotional offer processor coupled to the promotional offer memory to send a listing of electronic promotional offers to a plurality of communications devices each associated with a respective user based upon the plurality of electronic promotional offers,
using each of the plurality of communications devices to
display the listing of electronic promotional offers on a display,
cooperate with at least one input device to permit user selection of at least one of the electronic promotional offers from the listing thereof for clipping to a digital wallet associated with the respective user, and
transmit the selected at least one electronic promotional offer to the electronic promotional offer server via communications circuitry; and
using the electronic promotional offer server to determine if the selected at least one electronic promotional offer is currently unavailable based upon, after clipping, one of a number of already sent electronic promotional offers and the electronic promotional offer being cancelled before an expiration date of the electronic promotional offer by the respective offer issuer, and, when so, send at least one consolation electronic promotional offer to the communications device.

15. The method of claim 14 wherein the at least one consolation electronic promotional offer is for at least one of a same retailer as the currently unavailable at least one electronic promotional offer, a same brand as the currently unavailable at least one electronic promotional offer, and a same product and a different product brand as the currently unavailable at least one electronic promotional offer.

16. The method of claim 14 wherein the electronic promotional offer server is used to send at least one electronic promotional offer stored in the promotional offer memory and corresponding to the selected at least one electronic promotional offer when the selected at least one electronic promotional offer is currently available.

17. The method of claim 14 wherein the electronic promotional offer server is used to send the listing of electronic promotional offers to the plurality of communications devices based upon a user purchase history.

18. The method of claim 14 wherein the electronic promotional offer server is used to send the listing of electronic promotional offers to the plurality of communications devices via an email.

* * * * *